United States Patent [19]

Blazo

[11] Patent Number: 4,736,250

[45] Date of Patent: Apr. 5, 1988

[54] DIGITAL CAMERA FRAME CAPTURE CIRCUIT

[75] Inventor: Stephen F. Blazo, Portland, Oreg.

[73] Assignee: Tektronix, Inc., Beaverton, Oreg.

[21] Appl. No.: 936,054

[22] Filed: Nov. 28, 1986

[51] Int. Cl.⁴ .............................................. H04N 5/14
[52] U.S. Cl. .................................. 358/160; 358/244; 346/110 R
[58] Field of Search ...................... 358/160, 244, 244.1, 358/244.2, 345, 909, 37, 166; 346/110 R

[56] References Cited

U.S. PATENT DOCUMENTS

| | | | |
|---|---|---|---|
| 4,530,011 | 7/1985 | Haddick | 358/244 |
| 4,593,316 | 6/1986 | Kellar et al. | 358/166 |
| 4,639,784 | 1/1987 | Fling | 358/166 |
| 4,647,976 | 3/1987 | Nakagaki et al. | 358/909 |

*Primary Examiner*—James J. Groody
*Assistant Examiner*—Michael D. Parker
*Attorney, Agent, or Firm*—William O. Geny; George T. Noe

[57] ABSTRACT

A frame capture circuit for use with a video camera includes an analog-to-digital converter for converting composite video to digital form and a memory for storing sequential frames of digital video. The analog-to-digital converter is connected to the memory through a summer, and the memory has an output connected to a second summer input through a feedback loop. The feedback loop includes a switch controlled by a central processing unit such that when the switch is closed, the output of the memory is a composite video data frame comprising a current plus a previous frame of data. The central processing unit closes the switch whenever an event of interest displayed on an external device falls near the end of a frame of video generated by the camera so that the entire event is captured without regard to the scanning phase of the video camera.

10 Claims, 1 Drawing Sheet

DIGITAL CAMERA FRAME CAPTURE CIRCUIT

The following invention relates to a circuit in a digital camera for capturing a transient event.

Electronic test instruments such as oscilloscopes display visual waveforms on a CRT screen or other visual device, and it is sometimes desirable with such instruments to have photographic records of the waveforms displayed. Heretofore, cameras have been developed which are adapted to be clipped or mounted to the front of such instruments for photographing waveforms, and these cameras may provide a video signal output which may correspond to an RS-170 national video standard. According to this standard, the video data is generated in sequential frames at a predetermined frame repetition rate. A frame of video data is generated by an electronic scan of an image screen in the camera such as a charge coupled device (CCD). The CCD comprises a matrix of individual light-responsive points or pixels, each of which has an output corresponding to the level of light intensity sensed at that pixel.

Many oscilloscopes and other electronic instruments have a trigger output feature whereby a predetermined visual event appearing on the CRT or scope may create a pulse at a trigger output jack. This output pulse may be used for any purpose such as controlling the operation of peripheral devices. One use of a trigger output could be to trigger the operation of a camera such as that described above, so that the event appearing on the screen can be photographed by the camera. This would be a desirable feature where the camera must monitor the screen for long periods of time and relatively few or infrequent events of interest are expected.

In such cases, however, the event of interest may occur at a random time. That is, it will not necessarily be synchronized to the scanning phase of the digital camera. For example, the event of interest, and hence the trigger pulse, may occur near the end of one frame of data, just prior to a blanking pulse which reinitiates the scan. The length of time that the event appears on the screen, however, may carry it into the next frame, but the event, or portions of it, may be lost because only a portion of it would appear in one frame, and another portion would appear in the next frame. One method of solving this problem would be to synchronize the trigger output pulse with the scanning of the video camera. This solution, however, would dictate that the RS 170 video standard no longer be used.

SUMMARY OF THE INVENTION

The present invention provides a processing circuit associated with a video camera for capturing events of interest appearing on a CRT which are preceded by an external trigger output, without the need for synchronizing the trigger output with the scanning of the image screen of the video camera.

The frame capture circuit of the invention includes an analog to digital converter for converting the camera's video output to digital signals representing sequential frames of video data. The output of the analog-to-digital converter is connected to a summing circuit which selectively combines a current frame of video data with a previous frame of video data to yield a composite video frame. Memory means are then provided for storing the composite video frame.

The summer has an output bus connected to the input of a random access memory (RAM) which is connected by way of a feedback loop to a second input to the summer. The output of the RAM is also connected to a central processing unit which has an output for both a memory and a display unit. The feedback path from the RAM to the summer is interrupted by a switch which is controlled by the central processing unit. The central processing unit is, in turn, triggered by a trigger pulse which may be generated by the oscilloscope or test instrument containing the screen where the visual data is displayed. Upon receipt of the trigger pulse, the central processing unit closes the feedback loop switch causing the data in the RAM to be summed with video data from the analog-to-digital converter. Since the data is in the form of sequential frames of digitized video data, when the switch is closed, the output of the summer represents the current frame of video data plus a previous frame of video data. This composite frame of video data is provided to the central processing unit which stores it in a memory for later display or analysis.

The capture of the event of interest is therefore independent of the frame repetition rate or any synchronization between a trigger output pulse and the transition from one frame to the next during the scanning of the camera's image screen. This is because if part of the event falls in one frame and the rest of the event falls within the next frame, the entire event will be captured because the digitized video data is summed in the summing circuit whenever the switch connecting the feedback path from the RAM to the summer is closed.

When the trigger pulse occurs at the beginning of the frame, it is not necessary to close the feedback loop switch activating the summer because the event of interest will be captured in the current frame. Therefore, the central processing unit may be provided with a vertical blanking signal from a synchronization separator enabling it to make a determination as to whether the trigger pulse occurs close enough in time to the beginning of a frame so that closure of the switch is not necessary.

It is a primary object of this invention to provide a frame capture circuit to enable the capture of events of interest in response to a trigger output pulse without the need for synchronizing the trigger pulse with the scanning of the visual image by a camera.

A further object of this invention is to provide a frame capture circuit in which two standard frames of video data may be digitized and summed to provide a composite video image containing a visual event which may lie partly in one frame and partly in the next frame.

A still further object of this invention is to provide a frame capture circuit for a video camera which may be selectively operated depending upon the timing relationship between an external trigger signaling the occurrence of an event of interest and the phase of the scanning of the image by the video camera.

The foregoing and other objectives, features and advantages of the present invention will be more readily understood upon consideration of the following detailed description of the invention taken in conjunction with the accompanying drawings.

DETAILED DESCRIPTION OF THE INVENTION

Figure 2:
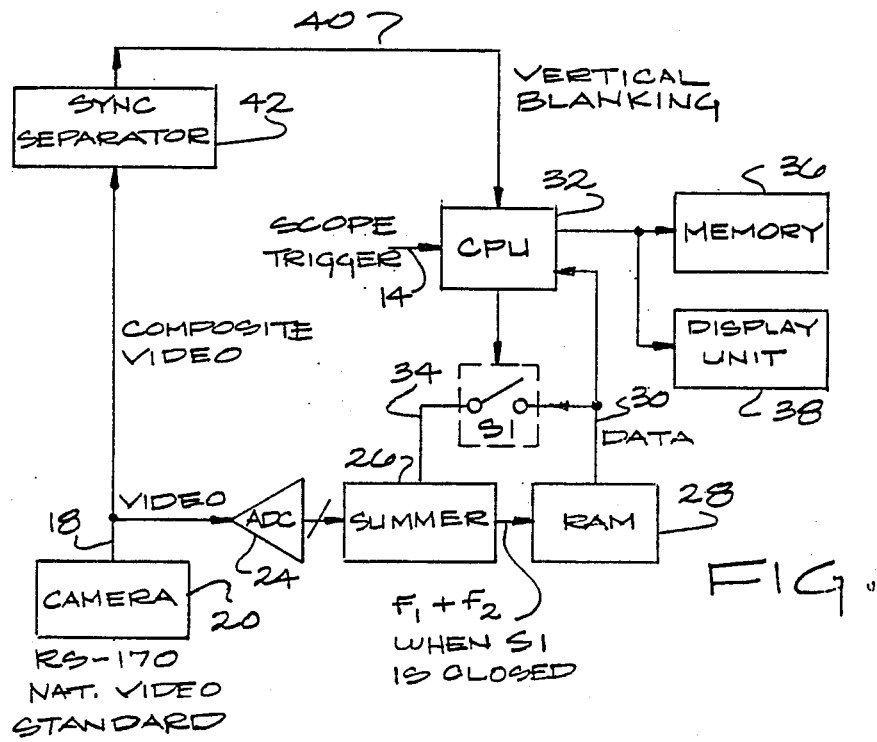
FIG. 2 is a block schematic diagram of the frame capture circuit of the present invention.
Figure 1:
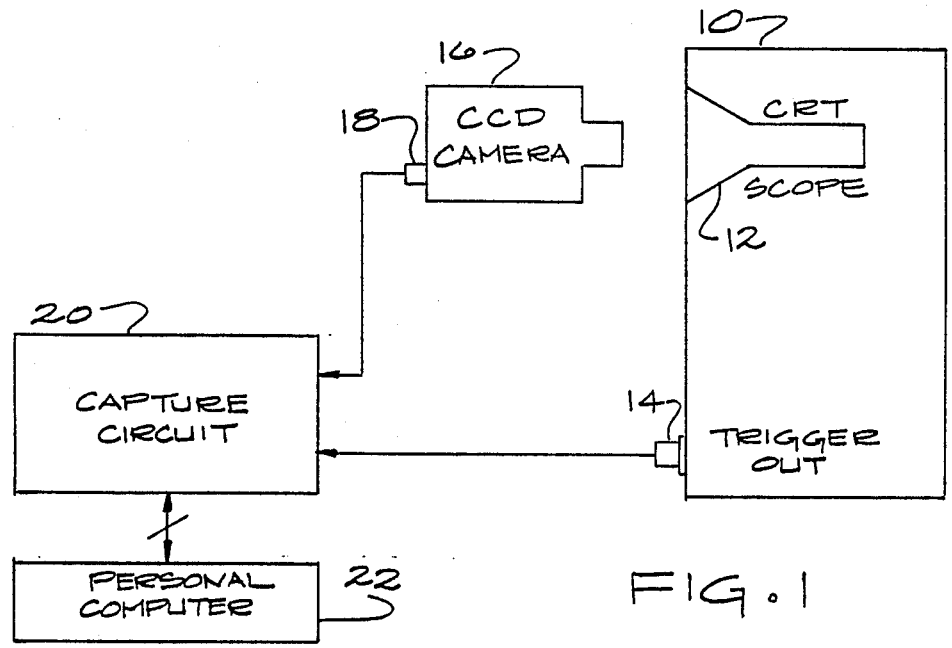
FIG. 1 is a schematic drawing of an oscilloscope or other test instrument and a camera for taking photographs of visual events appearing on the screen of the instrument coupled to the frame capture circuit of the instant invention.

An oscilloscope 10 may include a cathode ray tube (CRT) 12 upon which visual events are displayed which represent electrical waveforms measured by the oscilloscope 10. The oscillocope 10 may have a trigger output 14 which provides an output pulse whenever an event of interest (as determined by the user) is to be displayed on the CRT 12. A camera 16 which may, for example, include a charge coupled device (CCD) provides an output comprising sequential signals representing the relative brightness of each one of a matrix of pixels comprising the CCD. The pixel matrix is scanned sequentially once per frame and the video output 18 of the camera 16 is a standard RS-170 video output which represents the sequential frames of video data. Both the standard video output 18 and the trigger output 14 are connected to a frame capture circuit 20. The frame capture circuit 20 may include a central processing unit and internal memory, and may be connected to a personal computer 22.

Referring now to FIG. 2, the video output 18 is connected to analog-to-digital converter 24 which has an output connected to summer 26. The summer 26 is coupled to a random access memory (RAM) 28. The RAM 28 includes a data output 30 which is connected both to a central processing unit (CPU) 32 and to a feedback path 34 which includes a switch S1. The central processing unit 32 may include a memory 36, and may also provide an output to a display unit 38. The scope trigger output 14 is connected to the central processing unit 32 along with the vertical blanking output 40 of a sync separator 42.

Video data generated according to the RS-170 national video standard is digitized in analog-to-digital converter 24 which is, in turn, connected through summer 26 to RAM 28. When S1 is open, the digitized video data is extracted from RAM 28 and provided to CPU 32 which may either store the information in the memory 36 or provide it to personal computer 22 as desired by the user. When a trigger output on output 14 is provided by the oscilloscope 10, the central processing unit 32 determines the timing relationship between the scope trigger and the vertical blanking pulse present on output line 40. If the trigger pulse occurs just after a vertical blanking pulse, no action is taken by CPU 32. If, however, the scope trigger pulse occurs just before an expected vertical blanking pulse, the CPU 32 sends a signal to close switch S1. When this occurs, the frame of video data held within RAM 28 is provided by feedback line 34 to summer 26 where it is digitally summed with the output of ADC 24 representing the current video frame. Thus, when S1 is closed, the output of summer 26 is frame 1 plus frame 2. This output is stored in RAM 28 and eventually provided to CPU 32 over data line 30. After both frames of interest have been summed in summer 26, the CPU 32 commands S1 to open. Thus, the summer is operative only for one frame which corresponds to the frame following the frame in which the trigger pulse occurred. In this way, all of the image showing the event of interest on the CRT 12 is captured by digitally summing both frames in which portions of the visual image may have been captured by the camera 16. The composite video frame thus formed may be saved in the memory 36 for later display on display unit 38. Alternatively, the composite frame may be provided to the personal computer 22 for storage or later analysis and display.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A frame capture circuit for a video camera, said camera providing a video output at a predetermined frame repetition rate, comprising:
    (a) an analog-to-digital converter for converting said video output to digital signals representing sequential frames of video data;
    (b) a memory for temporarily storing said sequential frames of video data;
    (c) summing means for selectively combining digital signals representing a current frame of video data from said analog-to-digital converter with digital siganls representing a previous frame of video data from said memory to yield a composite frame of video data;
    (d) a trigger input for receiving trigger pulses; and
    (e) central processing unit means for selectively actuating said summing means when a trigger pulse is received at a predetermined time relative to a transition from one frame to another in said video camera.

2. The frame capture circuit of claim 1, further comprising means for storing said composite frame of video data in a memory and for selectively visually displaying said composite frame.

3. The frame capture circuit of claim 1 wherein said processing means selectively actuates said summing means when said trigger pulse is received just prior to said transition from one frame to another.

4. In combination with a video camera adapted for photographing images on a visual display screen and for providing an output comprising sequential frames of video data, a frame capture circuit comprising:
    (a) summing means for combining a current frame of said video data with a memory output signal comprising a previous frame of video data;
    (b) memory means connected to said summing means and having an output line for said memory output signal; and
    (c) selectively controllable switch means for connecting said output line of said memory means to said summing means whereby said current frame of video data is combined with said previous frame of video data to form a composite video data frame.

5. The frame capture circuit of claim 4, further comprising display means for displaying said composite video data frame.

6. The frame capture circuit of claim 4, further comprising second memory means for storing said composite video data frame.

7. The frame capture circuit of claim 4 wherein said switch means is selectively controlled in response to a trigger signal indicating the appearance on said visual display screen of an event of interest.

8. The frame capture circuit of claim 7 wherein said visual display screen is the display screen of an oscilloscope and said trigger signal input is connected to a trigger output located on said oscilloscope.

9. The frame capture circuit of claim 7, further comprising synchronization separator means for deriving a vertical blank pulse, one for each of said sequential frames of video data, and for controlling said switch means so that said switch means is closed in response to said trigger signal when said trigger signal occurs near the end of a frame of said video data.

10. A method of capturing a transient event appearing on a visual display screen comprising the steps of:

(a) photographing the visual display screen to provide a video output comprising sequential frames of digital video data;
(b) temporarily storing each frame of digital video data in a memory; and
(c) combining, only when said transient event occurs near the end of a frame of video data provided during the execution of step (a), a current frame of video data with a previous frame of video data stored in said memory to yield a composite frame of video data.

* * * * *